Jan. 17, 1933.   C. R. YENGST   1,894,527
VEHICLE CURTAIN
Filed March 18, 1930
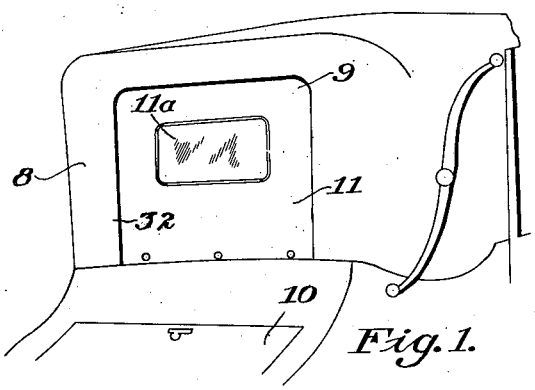
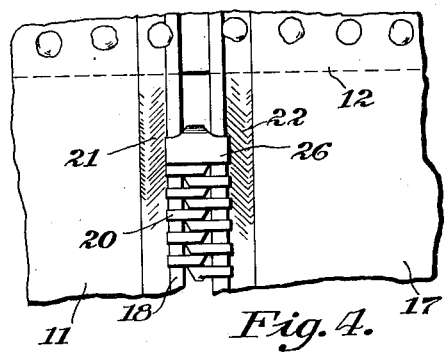
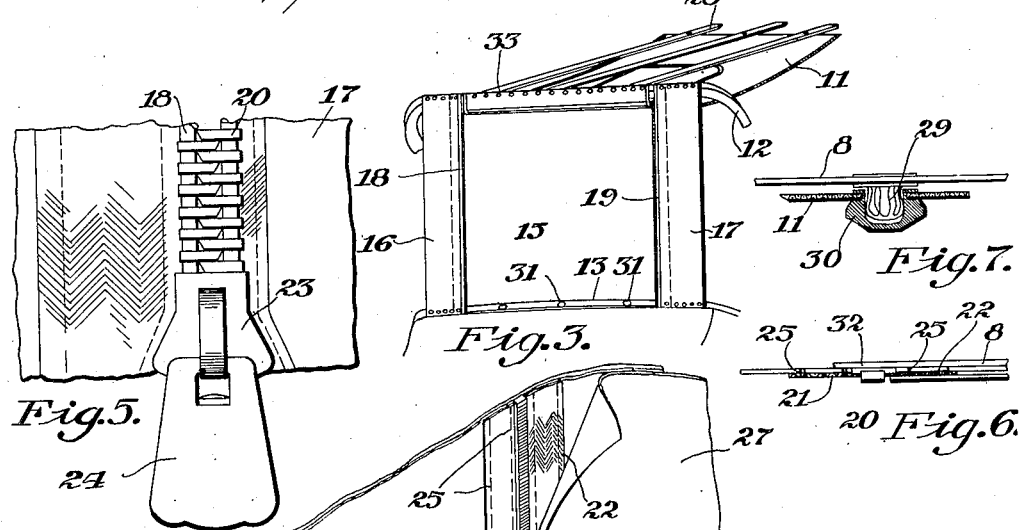
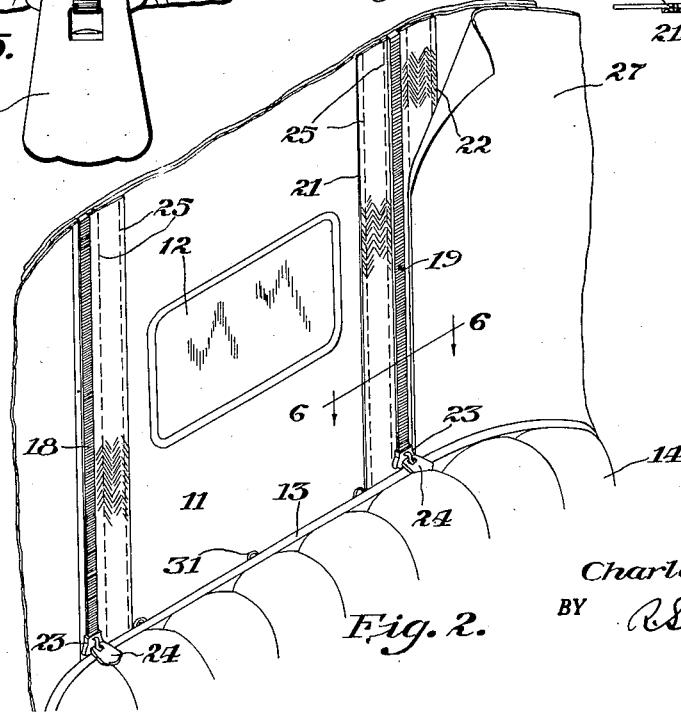
INVENTOR.
Charles R. Yengst.
BY
ATTORNEY.

Patented Jan. 17, 1933

1,894,527

UNITED STATES PATENT OFFICE

CHARLES RUSSELL YENGST, OF MEADVILLE, PENNSYLVANIA, ASSIGNOR TO HOOKLESS FASTENER COMPANY, A CORPORATION OF PENNSYLVANIA

VEHICLE CURTAIN

Application filed March 18, 1930. Serial No. 436,792.

My invention relates to compartments having openings closed by a curtain or the like such as in automobile tops, and especially to improved means for fastening such curtain in place.

An object of my invention is to provide improved means for attaching a curtain to opposite sides of a compartment whereby the same may be quickly opened.

Another object is to provide an improved construction of a compartment in which a yielding anchor member is interposed between the curtain and the compartment to permit of variations in the length of the curtain. It has been found in attempting to apply certain types of fasteners to automobile curtains so that the curtain can be quickly removed or fastened in place, that difficulty is encountered due to the fact that the material of the curtain shrinks a large amount when exposed to moisture, and it is particularly desirable to have the curtain and adjacent portions of the top at all times tight to provide a neat appearance.

In order properly to take care of this problem and to facilitate operation of slide fasteners when applied to such curtains, I have devised improved yielding anchoring means to which one side of the fastener may be attached whereby the curtain is permitted to shrink to a considerable extent without seriously impairing the ease of operation of the fastener.

Preferably such anchorage strips are attached at opposite ends only, although they may be loosely sewn or otherwise secured between their ends to the material of the top. It is also preferable to provide such anchorage strips along both vertical edges of the opening to be closed so that the shrinkage of the curtain may be absorbed equally by both sides. However, in some instances, a single yielding anchor strip may be sufficient.

In one embodiment of the invention which has been found very satisfactory in practice, a pair of loosely woven but strong fabric strips several inches wide on opposite sides of the curtain are tacked at their upper ends to the wooden bow extending across the top and at their lower ends to the body, being free to yield laterally between their ends. In other cases other types of material, and other ways of holding the strips in place may be found suitable. Some variations might be rubberized stretchy fabrics, and fabric strips cut on a bias and secured along one side edge instead of at the ends.

Other objects and advantages of the invention will hereinafter more fully appear.

In the accompanying drawing, I have shown for purposes of illustration, one embodiment which my invention may assume in practice. In the drawing:

Fig. 1 is a perspective view illustrating a portion of an automobile top in which my invention may be incorporated.

Fig. 2 is a view illustrating a portion of the interior of such an automobile top equipped with my improved curtain fastening means.

Fig. 3 is an exterior perspective view of an automobile top embodying the invention with the outer covering or top material removed to facilitate illustration.

Fig. 4 is an enlarged elevation view of the upper end of one of the slide fasteners and adjacent portions.

Fig. 5 is an elevation view of the lower end of such slide fastener and the adjacent portions.

Fig. 6 is a cross-sectional view on line 6—6 of Fig. 2.

Fig. 7 is a detail sectional view illustrating one of the snap fasteners shown in Fig. 3.

I have shown one embodiment of my invention incorporated in an automobile top, which for purposes of explanation, is preferably of the roadster or convertible coupe type, in which an outer covering 8 of heavy fabric waterproof material is stretched tightly over the frame members. The top has a rear opening 9 to facilitate communication between the front seat compartment and the rumble seat 10. This rear opening is closed by a curtain 11 having a glass window 11a and the curtain is also preferably made of heavy waterproof fabric material similar to the material of the outer covering 8. It has been found in practice, that these materials are liable to shrink to a considerable extent when exposed to the elements and one of the important features of my invention is to take care of this shrinkage particularly of the curtain.

Referring more in detail now to the top construction as seen in Fig. 3, with the covering material 8 removed, it will be seen that a bow 12 extends horizontally across the upper portion of the top and is connected to the body of the car in any suitable well-known manner. A wooden member 13 forming a part of the body is located just behind the front seat 14, and the opening 15 thus provided between the members 12 and 13 is normally closed by the curtain 11. On opposite sides of the opening 15 are spaced yielding anchor strips 16 and 17. These strips as shown, are several inches wide and tacked or otherwise attached to the upper and lower frame members 12 and 13 but are unattached between their ends, although in cases where desired, they might be sewn loosely to the outer or inner layers of the top.

These yielding anchor strips are so positioned that they are normally adjacent the vertical edges of the curtain 11, and slide fasteners 18 and 19 fasten the side edges of the curtain to the yielding anchor strips. While any of the known types of slide operated or similar fasteners may be used advantageously for my purpose, the preferable one is of the general type disclosed in the patent to Gideon Sundback, 1,219,881, March 20, 1917. Such a fastener usually comprises opposed series of interlocking units 20 which are clamped to the corded edges of a pair of fabric tapes 21 and 22. A slider 23 is actuated along series of interlocking units to engage or release them by means of a pull or actuating member 24. The tapes 21 and 22 of each fastener form a convenient means for attachment of the slide fasteners to the curtain and to the yielding member 16 and 17, such attachment being preferably accomplished by lines of sewing 25 as best shown in Fig. 2. As shown in Fig. 4 the fastener stringers or tapes 21 and 22 are preferably permanently united by means of a stop member 26 which limits the upward travel of the slider. The stop 26 is preferably spaced from the upper end of the curtain a substantial amount to avoid interference of the slider with the frame member 12, and to facilitate folding of the curtain inwardly.

As best seen in Figs. 2 and 6, an inner lining 27 for the said compartment is secured in any suitable way to the frame members of the top and the edges of the lining adjacent the rear opening are shown as terminating adjacent the slide fasteners although they may, if desired, overlap the metal parts of the fastener. In Fig. 3, are shown a plurality of straps 28 extending forwardly from the frame member 12 under the top covering and each of these straps is shown as provided with the male parts 29 of snap fastenings to cooperate with the snap buttons 30 along the lower edge of the curtain 9, to hold the curtain up against the top as illustrated in Fig. 3 when it is desired not to have the opening closed by the curtain. Other male fastening units 31 are attached to the member 13 with which the buttons 30 may be engaged to hold the lower edge of the curtain in place when the opening is closed.

It will be observed that the material 8 of the outer covering is extended over the metal parts of the fastener to provide flaps 32, thus preventing the entrance of water and dust into the compartment.

In operation, assuming the curtain to be in the closed position, it is simply necessary to unfasten the snap buttons if such are provided, and pull the sliders 23 to the upper limit of their travel, when the curtain may be folded inwardly and attached to the straps 28. The curtain may be as quickly fastened up to close the compartment by reversing the same operations. Now assuming that the curtain 11 has shrunk to some extent, or for any other reason is shorter than the normal distance between the anchor strips 16 and 17, these strips will yield laterally when the sliders are pulled down and thus make up for the shrinkage of the curtain. At the same time, all undue strain is removed from the fastener which otherwise might make it impossible to move the slider to closed position, since it is difficult to move the slider when the fastener has to be closed under very great strain.

Although the curtain 11 is preferably tacked along its upper edge to the bow 12 as indicated at 33, if desirable it may, of course, be detachably secured at this point whereby the curtain can be completely removed.

While I have in this application specifically described one embodiment which my invention may assume in practice, it will be understood that this embodiment is merely for the purposes of illustration and description and that various other forms may be devised within the scope of my invention as defined in the appended claims.

What I claim as my invention is:

1. In a vehicle top having an opening, a curtain for closing the opening, said top having a rigid frame member extending across the top of said opening, means for attaching said curtain to said frame member, and a pair of slide fasteners along the vertical edges of said curtain for attaching the opposite sides of the curtain to said top, said fasteners extending continuously from the bottom of said curtain to retain said curtain under tension in all portions and terminating at a point spaced a substantial distance from the frame member, said curtain adapted to be folded upwardly when not in use.

2. An automobile body having a front covered compartment, said compartment having an opening of rectangular shape, a curtain for closing said opening, said curtain being attached along its upper edge to said compartment, yielding anchor strips of loosely woven fabric one at each side of said opening attached to said body only at their top and bottom ends whereby they are permitted to yield inwardly to compensate for shrinkage of said curtain, said slide fasteners extending continuously along the vertical sides of said curtain from the top to bottom for connecting the edges of said curtain with the edges of said anchor strips, and means for detachably fastening the lower edge of said curtain to said body.

3. In a vehicle top having an opening, a curtain for closing the opening attached along one of its horizontal edges to said top, a yielding anchor strip on at least one of the vertical sides of said opening, said strip being made of loosely woven fabric and of at least two inches in width and attached at its top and bottom ends to portions of said top and unattached throughout the vertical extent of said opening whereby it may yield inwardly a substantial amount, and means for fastening the vertical edges of said curtain in position including a slide fastener connecting at least one of said vertical edges to said anchor strip.

In testimony whereof I affix my signature.

CHARLES RUSSELL YENGST.